Patented Oct. 12, 1937

2,095,600

UNITED STATES PATENT OFFICE 2,095,600

PROCESS FOR THE PRODUCTION OF FAST TINTS ON THE FIBER

Charles Graenacher, Basel, Franz Ackermann, Binningen, near Basel, and Heinrich Bruengger, Basel, Switzerland, assignors to the firm of Society of Chemical Industry in Basle, Basel, Switzerland No Drawing. Application July 23, 1936, Serial No. 92,246. In Switzerland August 17, 1935

22 Claims. (Cl. 8—5)

In patent applications Serial No. 92,244 filed July 23, 1936, and No. 92,245 filed July 23, 1936, there have been described new dyestuff derivatives which correspond to the general formula

$R_1$—O—$R_2$ wherein $R_1$ represents the radical of a dyestuff containing at least one hydroxyl group, and $R_2$ represents the radical of an organic acid containing at least one group capable of rendering the dye soluble. Examples of such dyestuff derivatives are inter alia the condensation products which are obtained by the action of benzoic acid-sulfochloride, benzoic acid-disulfochloride, or 4-chloromethyl-1-benzoylchloride in the presence of pyridine on the insoluble azo-dyestuffs from naphthols or arylides of 2:3-hydroxy-naphthoic acid and diazo-compounds which do not contain sulfonic groups or carboxyl groups.

The dyestuff derivatives of the above explained general formula $R_1$—O—$R_2$ are distinguished from the parent dyestuffs corresponding to the formula $R_1$—O—H by their solubility in water and their increased solubility in water, respectively. Under the influence of saponifying agents, particularly pyridine, they split off easily the radical $R_2$ and then regenerate the sparingly soluble or practically insoluble dyestuff.

It has been found that the new dyestuff derivatives corresponding to the formula

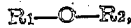

$R_1$—O—$R_2$, wherein $R_1$ and $R_2$ have the meaning indicated above, can be used successfully for the production of fast tints on the fiber by treating these dyestuff derivatives on the fiber with saponifying agents, whereby the dyestuff corresponding to the radical $R_1$ is regenerated on the fiber.

In the products of the above mentioned general formula $R_1$—O—$R_2$ the radical $R_1$ may stand for various dyestuffs, for example for azo-dyestuffs. It may, however, also stand for the radical of other dyestuff classes, for example for the radical of nitro dyestuffs, or of anthraquinone dyestuffs or of triphenylmethane dyestuffs or of azine or oxazine dyestuffs, and the like. A great number of such dyestuff derivatives has been described in patent applications Serial No. 92,244 filed July 23, 1936, and No. 92,245 filed July 23, 1936, and for brevity's sake reference is made to these specifications. Nevertheless it is pointed out that among these preparations those producing the best results or the fastest dyeings in which the dyestuff corresponding to the radical $R_1$ contains neither sulfonic groups nor carboxyl groups, and in which the radical $R_2$ represents an acyl radical containing at least one salt-forming group selected from the group consisting of carboxyl and sulfonic groups, for example an acyl radical which derives from organic acids, such as benzene-1:3:5-tricarboxylic acid, benzene hexacarboxylic acid, naphthalene-1:3:6-trisulfonic acid, the mono-sulfobenzoic and the di-sulfobenzoic acids. Among these products those are again particularly valuable which derive from insoluble azo-dyestuffs, particularly from insoluble azo-dyestuffs, which derive themselves from arylides of aromatic ortho-hydroxycarboxylic acids, particularly from arylides of the 2:3-hydroxynaphthalene-carboxylic acid.

The new dyestuff derivatives can be applied to the fiber according to various methods of printing and dyeing. They may be applied to animal fibers such as wool or silk, to vegetable fibers such as cotton, jute, ramie or linen, to artificial fibers such as artificial silk from regenerated cellulose, for example viscose or copper artificial silk, and also to artificial fibers from cellulose esters or ethers, for example acetate artificial silk; further to mixtures of such textiles among one another, for example mixtures of wool or natural silk with viscose or acetate artificial silk. When dyeing vegetable fibers there are preferably used derivatives which have affinity for the vegetable fiber. This affinity can be enhanced by suitably pretreating the fiber. This may be done for example by pre-treating the material to be dyed of animal, vegetable or artificial origin with cation-active assistants, for example with compounds having a long aliphatic chain and the solubility of which is due to the presence of a basic amino group or a quaternary ammonium group.

The saponification can be carried out by treatment with acids, or also, and preferably, with alkalies. Such alkalies are for example caustic alkalies, such as dilute solutions of the hydroxides of the alkali metals or of the alkaline earth metals, further salts thereof having an alkaline action, such as for example alkaline carbonates, borates, phosphates, and the like, further ammonia, ammoniumcarbonate or organic amines, that is to say mild alkalies.

The new process is used particularly advantageously in printing. Due to the extraordinarily simple retransformation of the dyestuff derivatives into the initial dyestuffs, it is possible to combine the new process with the most various methods of printing. It can particularly be combined with vat colors and chrome colors. The new process is particularly valuable because the retransformation of the dyestuff derivatives to the parent dyestuffs may take place without acid treatment, so that the production of combination effects together with vat dyes is considerably facilitated.

If in the new dyestuff derivatives the radical $R_1$ belongs to a dyestuff group which is easily destroyed by reduction or by oxidizing agents, this property may be used in reserve printing or discharge printing. Finally, effects can be produced by developing the new dyestuff derivatives together with other dyestuff derivatives which regenerate the dyestuffs by treatment with alkalies. Combination shades are then obtained. Combination shades may of course also be obtained by using simultaneously mixtures of various dyestuff derivatives of the general formula $R_1$—O—$R_2$, in which the radical $R_1$ may belong to various dyestuff classes, for example vat dyes or azo-dyes.

The following examples illustrate the invention:—

Example 1

0.3 part of the product of the reaction between benzoic acid-meta-sulfochloride and the azo-dye obtained by coupling diazotized α-naphthylamine and β-naphthol are dissolved by boiling in 100 parts of water. The dye bath is made up of 10 parts of wool, 200 parts of water and 10 per cent. of crystalline sodium sulfate, the dissolved dye is added and the whole is made up to 400 parts. At 60° C. 4 per cent. of acetic acid of 40 per cent. strength is added. The bath is then raised to boiling within 30 minutes, and is boiled for an hour during which period dyeing occurs. The wool is then washed and treated as follows:—

It is introduced into a bath in a liquor ratio of 1:40 which contains 20 gm. of common salt and 20 cc. of ammonia per litre. The goods are entered at 50° C. and the bath is heated slowly to 80° C. whereupon the material is handled at this temperature for an hour. The wool, which is dyed fast, especially to washing, a deep Bordeaux tint, is then washed and dried. The same result is obtained with the product of Example 1.

Example 2

0.4 part of the product of the reaction between benzoic acid-3:5-disulfochloride and the azo-dye obtained by coupling 1 mol. of tetrazotized benzidine and 2 mols of β-naphthol are together dissolved in 100 parts of water. The dye bath is made up with 10 parts of cotton and 100 parts of water, the dissolved dye is added and the whole is made up to 250 parts. The temperature is 60° C. 2 per cent. of sodium carbonate is added, the bath is warmed to 95° C. within 30 minutes, 40 per cent. of crystallized sodium sulfate is added and the cotton is dyed for an hour at 95° C. The bath is then cooled within half an hour to 25° C. and the cotton is wrung out, treated for 2 minutes in the cold with a caustic alkaline solution which contains, for example, 100 grams of sodium hydroxide per litre, washed, acidified for 2 minutes in the cold with a solution containing 1 gram of sulfuric acid of 66° Bé. per litre, rinsed and finally boiled with 3 grams of soap for 10 minutes. The cotton is dyed fast violet.

Example 3

10 parts of acetate artificial silk are dyed in a dye bath consisting of 0.2 part of the product of the reaction between benzoic acid-meta-sulfochloride and the azo-dye obtained from para-anisidine and para-cresol and 300 parts of water for 1½ hours at 40–80° C. After dyeing for half an hour 1 cc. of a solution of ammonia of 5 per cent. strength is added to the bath. The acetate silk is dyed fast yellow.

Example 4

8 parts of the product of the reaction between benzoic acid disulfochloride and the azo-dyestuff obtained by coupling diazotized α-naphthylamine and β-naphthol are made into a printing paste with 25 parts of water, 60 parts of neutral starch tragacanth thickening and 7 parts of acetic acid. This paste is printed on a cotton fabric, which is then dried, steamed for ½ to 1 hour at ¼ atmosphere pressure and developed by drawing through a sodium hydroxide solution of 10 per cent. strength at room temperature. It is then washed and soaped at the boil. The fabric is printed a deep Bordeaux red.

Example 5

8 parts of the product of the reaction between benzoic acid sulfo-chloride and the azo-dyestuff obtained by coupling diazotized 4-chlor-ortho-toluidine and β-oxynaphthoic acid-para-methoxy-ortho-toluidide, 33 parts of water, 54 parts of neutral starch tragacanth thickening, 1 part of sodium chlorate and 4 parts of butyl glycol are made into a printing paste. The fabric is then treated as in the previous example; there is obtained a pure fast red print. By printing the product of the reaction between benzoic acid sulfochloride and the azo-dye obtained by coupling diazotized 4-chlor-2-aminophenol and para-cresol and treating the print with an alkaline copper solution the azo-dye is reproduced on the fibers and simultaneously forms a copper complex.

Example 6

Into a dye-bath containing 0.2 part of the dyestuff from diazotized chloranisidine $$(Cl:O:CH_3:NH_2=1:4:3)$$

and 2:3-oxynaphthoic acid-ortho-anisidide and subsequent esterification with metabenzoic acid-sulfochloride, 400 parts of water and 3 parts of acetic acid of 10 per cent. strength, there are introduced, at 60° C., 10 parts of boiled natural silk. The bath is heated for 20 minutes from 60° to 80° C. and dyeing continued for 1 hour at 90–95° C. After addition of 0.8 part of sodium acetate to the dye-bath cooled to 70–80° C., the dyeing is completely developed during ½ hour, whereupon it is rinsed and dried. There is obtained an intensive blue-red dyeing which is characterized by an excellent fastness to washing.

Example 7

A dye-bath is prepared consisting of 0.3 part of the product obtained by the action of benzoic acid-meta-sulfochloride on the azo-dyestuff from diazotized nitrotoluidine 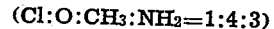 and 2:3-oxynaphthoic acid-anilide, 400 parts of water, 1 part of crystallized sodium sulfate, and 0.4 part of acetic acid of 40 per cent. strength. 10 parts of wool are introduced at 60° C., the bath is heated to boiling within 20 minutes, and dyeing is continued at the boil for 1 hour. 0.8 part of sodium acetate is then added and boiling is continued for a further hour. The wool is then rinsed and dried. It is dyed fast red tints of particularly good fastness to washing and fulling.

Example 8

A dye-bath is prepared consisting of 0.3 part of the product obtained by the action of benzoic acid-monosulfochloride on the azo-dyestuff from diazotized mono-benzoyl-2:5-diamino-hydroquinone-diethyl-ether and 2:3-oxynaphthoic acid-anilide, 250 parts of water, 2 parts of sodium sulfate and 1 part of acetic acid of 40 per cent. strength. 10 parts of cotton yarn are introduced at 50° C., the bath is heated within ½ hour to boiling temperature and dyeing is continued for another hour, while adding again 2 parts of sodium sulfate. The dye-bath is nearly exhausted. In order to develop the shade, 1 part of sodium carbonate is added to the dye-liquor which is maintained at boiling temperature for about 15 minutes. The material is then rinsed and soaped at the boil. The cotton is dyed fast blue tints.

Example 9

The following two printing pastes are prepared:—

(a) 
| | Grams |
|---|---|
| Product obtained by the action of meta-benzoic-acid-sulfochloride on the azo-dyestuff from diazotized 3-chloraniline and the anilide of 2:3-oxynaphthoic acid | 80 |
| Water cc | 270 |
| Urea grams | 50 |
| Resorcinol do | 50 |
| Neutral starch tragacanth thickening do | 550 |
| | Grams 1000 |

(b) 
| | Grams |
|---|---|
| Paste of 20% strength of tetrabromo-indigo | 150 |
| Potash thickening | 650 |
| Sodium-sulfoxylate-formaldehyde | 80 |
| Urea | 80 |
| Water | 40 |
| | Grams 1000 |

The potash thickening used above is made from:—

| | Grams |
|---|---|
| Wheat starch | 110 |
| Water | 170 |
| Tragacanth thickening (60/1000) | 250 |
| British gum | 200 |
| Potassium carbonate | 170 |
| Glycerine | 100 |
| | Grams 1000 |

The two colours are printed simultaneously onto the cotton fabric in a two roller machine. The fabric is dried, steamed in the Mather-Platt for 5–10 minutes, and passed through a solution containing 6 per cent. of sodium hydroxide and 0.05 per cent. of potassium ferricyanide in such a manner that the action of the solution lasts about 45 seconds. The material is then thoroughly washed, if necessary acidified, washed again and soaped at the boil.

There is obtained a brilliant orange and blue two colour print having excellent fastness properties.

Example 10

The following two printing pastes are prepared:—

(a)
| | Grams |
|---|---|
| Product obtained by the action of meta-benzoic acid-sulfochloride on the azo-dyestuff from diazotized 4:4'-dichloro-2-amino-1:1'-diphenylether and the ortho-anisidide of 2:3-hydroxynaphthoic acid | 80 |
| Water | 270 |
| Thiodiglycollic ether | 150 |
| Neutral starch tragacanth thickening | 500 |
| | Grams 1000 |

(b)
| | Grams |
|---|---|
| Cibanone Green G, double paste (Colour Index No. 1174) | 150 |
| Potash thickening (produced as indicated in Example 9) | 650 |
| Sodium sulfoxylate formaldehyde | 80 |
| Urea | 80 |
| Water | 40 |
| | Grams 1000 |

The two colours are printed simultaneously onto the cotton fabric. The fabric is then dried, steamed in the Mather-Platt for 5–10 minutes, and passed at room temperature through a solution containing 6 per cent. of sodium hydroxide and 0.05 per cent. of potassium ferricyanide in such a manner that the action of the solution lasts about 45 seconds. The material is then thoroughly washed, if necessary acidified, washed again and soaped at the boil.

There is obtained a brilliant green-red two colour print having excellent fastness properties.

Example 11

The following two printing pastes are prepared:—

(a)
| | Grams |
|---|---|
| Product obtained by the action of meta-benzoic acid-sulfochloride on the azo-dyestuff from diazotized 2:5-dichloraniline and the ortho-anisidide of 2:3-oxynaphthoic acid | 80 |
| Water | 270 |
| Thiodiglycollic ether | 150 |
| Neutral starch tragacanth thickening | 500 |
| | 1000 |

(b)
| | Grams |
|---|---|
| Indigosol O4B (Colour Index No. 1184) | 50 |
| Glycerine | 30 |
| Water | 370 |
| Neutral starch tragacanth thickening | 450 |
| Ammonium thiocyanate solution of 50 per cent. strength | 40 |
| Sodium chlorate solution of 33 per cent. strength | 40 |
| Ammonium vanadate solution of 1 per cent. strength | 10 |
| Ammonia | 10 |
| | 1000 |

The two dyestuff pastes are printed simultaneously and the printed material is treated as described in Example 9.

There is obtained a very beautiful scarlet-red and blue two colour print.

*Example 12*

The following two printing pastes are prepared:—

(a) Printing paste as described in Example 9 under (a).

| | Grams |
|---|---|
| (b) Rapidogen Violet B (Schultz, Farbstofftabellen, 7th edition, 1st suppl. page 123) | 80 |
| Water | 310 |
| Sodium hydroxide solution of 30 per cent. strength | 30 |
| Turkey red oil | 30 |
| Neutral starch tragacanth thickening | 550 |
| | 1000 |

The two pastes are printed simultaneously, and the printed material is dried, subjected to an acid steaming for 5 minutes, and passed at room temperature through a solution of sodium hydroxide of 6 per cent. strength, so that the action of the solution lasts 45 to 60 seconds. The material is now washed and soaped at the boil. There results a fast orange-violet two colour print.

*Example 13*

The following printing paste is prepared:—

| | Grams |
|---|---|
| Dyestuff derivative used in Example 11 under (a) | 80 |
| Water | 270 |
| Thiodiglycol | 150 |
| Neutral starch tragacanth thickening | 400 |
| Zinc oxide | 100 |
| | 1000 |

The paste is printed onto white cotton fabric and dried. The fabric is then padded with an aniline black solution, containing per litre

| | Grams |
|---|---|
| Aniline hydrochloride | 84 |
| Tragacanth thickening 60/1000 | 40 |
| Aniline | 5 |
| Potassium ferrocyanide | 54 |
| Sodium chlorate | 30 | dried (if necessary steamed in the Mather-Platt for 3 minutes) and passed for 45 seconds at room temperature through a solution containing 6 per cent. of sodium hydroxide and 0.1 per cent. of potassium ferricyanide. The material is then thoroughly rinsed, acidified with warm dilute acetic acid or formic acid, again rinsed and soaped at the boil. There is obtained a brilliant scarlet-red reserve print on black ground.

*Example 14*

A printing paste is prepared having the following composition

| | Grams |
|---|---|
| Product obtained by the action of benzoic acid sulfochloride on the azo-dyestuff from diazotized 2:5-dichloraniline and the ortho-anisidide of 2:3-oxynaphthoic acid | 80 |
| Water | 320 |
| Butyric acid amide | 100 |
| Neutral starch tragacanth thickening | 500 |
| | 1000 |

The printed material is treated after drying as described in Example 9. There is obtained a full scarlet-red print. Good prints may also be obtained if the butyric acid amide is not added to the printing colour, but if the fabric is impregnated therewith before printing. The operation is then as follows:—

The cotton fabric is padded with an aqueous solution containing 5 per cent of butyric acid amide and dried. The following printing paste is then printed onto the material:—

| | Grams |
|---|---|
| Dyestuff derivative indicated above | 80 |
| Water | 320 |
| Thiodiglycol | 100 |
| Neutral starch tragacanth thickening | 500 |

The printed cotton fabric is after-treated as described in Example 9. There is obtained a very beautiful and fast scarlet-red print.

*Example 15*

Mercerized cotton fabric is padded with an aqueous solution containing 5 per cent. of piperazine and then dried. A printing paste as described in Example 10 under (a) is printed onto the fabric and dried. The material is steamed in the Mather-Platt for 5 to 10 minutes, washed and dried. There is obtained an intensive and fast red print.

*Example 16*

Cotton fabric is moved about for ½ hour at 35° C. in a solution containing per liter 5 g. of the quaternary ammonium compound from dimethylsulfate and 1-stearoylamino-4-dimethylaminobenzene, squeezed out and then dried.

A printing paste as described in Example 9 under (a) is printed onto the fabric thus pretreated, and dried. After passage through a lye and further treating the fabric as described in Example 9, there is obtained a more intensive print than is the case with a material which is not pre-treated.

*Example 17*

Bleached cotton fabric is impregnated on the padding mangle (Foulard) with a solution of

| | Grams |
|---|---|
| Product obtainable by the action of benzoic acid-sulfochloride on the azo-dyestuff from diazotized 2:5-dichloraniline and the ortho-anisidide of 2:3-oxy-naphthoic acid | 50 |
| Thiodiglycol | 50 |
| Water | 850 |
| Tragacanth | 50 |
| | 1000 |

The material is dried in the hot flue, passed for 5 minutes through the Mather-Platt, and then padded on the mangle in a bath containing 6 per cent. of sodium hydroxide. It is then exposed to the air for 45 to 60 seconds, rinsed open width, followed by a passage through a solution containing per liter 5 cc. of concentrated hydrochloric acid, whereupon the material is thoroughly rinsed and soaped at the boil. The fabric is thus dyed a fast scarlet-red uniform shade.

*Example 18*

White effects on a coloured ground are obtained by impregnating bleached cotton fabric with the solution described in Example 17, drying in the hot flue and then printing with a printing paste containing per kilo 200 g. of sodium sulfoxylate formaldehyde. The printed fabric is th steamed in the Mather-Platt and developed as indicated in Example 17. White effects on a coloured ground are thus obtained.

Example 19

Coloured effects on a coloured ground are obtained by impregnating bleached cotton fabric in the Foulard apparatus with a padding solution corresponding to that described in Example 17. The impregnated fabric is dried on the hot flue and printed for example with the following printing paste:—

| | Grams |
|---|---|
| Paste of 20 per cent. of tetrabromoindigo | 200 |
| British gum 1:1 | 470 |
| Glycerine | 60 |
| Potash, dissolved warm, added cold | 150 |
| Sodiumsulfoxylate formaldehyde | 120 |
| | 1000 |

The fabric is steamed in the Mather-Platt and developed as described in Example 17. Coloured effects on a coloured ground are thus obtained.

Example 20

The following two printing pastes are prepared:—

(a) The same printing paste as described in Example 9 under (a);

(b)
| | |
|---|---|
| Eriochrome Azurol S (Colour Index Nr. 723) grams | 20 |
| Water cc | 250 |
| Neutral starch tragacanth thickening grams | 600 |
| Acetic acid of 40 per cent. strength grams | 30 |
| Chromous acetate solution of 20° Bé. grams | 100 |
| Grams | 1000 |

The two colours are printed simultaneously onto cotton fabric which is then dried, steamed for 45 minutes at an over-pressure of ¼ atm. and developed as indicated in Example 21 hereafter. There is obtained a beautiful orange-blue two colour print.

Example 21

The following printing paste is prepared:—

| | |
|---|---|
| Product obtained by the action of meta-benzoic acid-sulfochloride on the azo-dyestuff from diazotized 4-(4'-methyl)-phenoxy-acetylamino-2:5-diethoxy-1-amino-benzene and the anilide of 2:3-hydroxynaphthoic acid grams | 40 |
| Product obtained by the action of meta-benzoic acid-sulfochloride on the azo-dyestuff from diazotized 3-aniline chloride and the anilide of 2:3-hydroxynaphthoic acid grams | 40 |
| Water cc | 270 |
| Thiodiglycol grams | 100 |
| Neutral starch tragacanth thickening grams | 550 |
| | 1000 |

The colour is printed onto the cotton fabric, which is then dried, steamed in the Mather-Platt for 5-10 minutes and passed at room temperature through a solution containing 6 per cent. of sodium hydroxide. The material is then rinsed, acidified, rinsed again and soaped at the boil. There is obtained a fast brown-violet print.

Example 22

The following printing paste is prepared:—

| | |
|---|---|
| Product obtained by the action of 3:5-benzoic acid-disulfochloride on 1:5-dibenzoyldiamino-4:8-dihydroxy-anthraquinone grams | 16 |
| Product obtained by the action of meta-benzoic acid-sulfochloride on the azo-dyestuff from diazotized 3-aniline chloride and the anilide of 2:3-hydroxynaphthoic acid grams | 64 |
| Water cc | 270 |
| Thiodiglycol grams | 100 |
| Neutral starch tragacanth thickening grams | 550 |
| Grams | 1000 |

The material is printed and developed as indicated in Example 21. There is obtained a very fast brown print.

Example 23

The following printing paste is prepared:—

| | |
|---|---|
| Product obtained by the action of meta-benzoic acid-sulfochloride on indigo grams | 16 |
| Product obtained by the action of meta-benzoic acid-sulfochloride on the azo-dyestuff from diazotized 3-aniline chloride and the anilide of 2:3-hydroxynaphthoic acid grams | 64 |
| Water cc | 270 |
| Thiodoglycol grams | 100 |
| Neutral starch tragacanth thickening grams | 550 |
| Grams | 1000 |

The material is printed and developed as indicated in Example 21. There is obtained a very fast brown print.

Example 24

10 parts of cotton are dyed for one hour at 90-100° C. in a dye-bath prepared with 0.4 part of the dyestuff obtained from tetrazotized 2-methyl-4:4'-diamino-5-methoxy-azobenzene and 2-hydroxynaphthalene and subsequent esterification with 4-chloromethyl-benzoylchloride in pyridine solution and 4 parts of sodium chloride. There is obtained a yellowish-brown shade which yields a violet-blue dyeing when developed for 10 minutes in a bath containing caustic soda solution of 5-6 per cent. strength. The dyeing is then thoroughly rinsed and dried.

Example 25

A dye-bath is prepared consisting of 1.5 parts of the product of the reaction of benzoic-acid disulfochloride on the azo-dyestuff obtained by the action of diazotized xylidine on meta-amino-benzoyl-2-amino-5-hydroxynaphthalene-7-sulfonic acid, diazotizing this product and coupling it with β-naphthol, and 600 parts of water. Into the dye-bath thus prepared 30 parts of cotton previously wetted in water are entered, heating the bath within 20 minutes to 90-95° C., and adding 15 parts of sodium sulfate, continuing dyeing at this temperature for 1 hour. The cotton is then allowed to exhaust the bath during 1 hour while the latter is cooling. Development or fixation of the dyeing is effected in such a manner that the material is after-treated for 10 minutes, in the cold, in 400 parts of a liquor containing 5 per cent. of sodium hydroxide. The material is then washed and soaped at a moderate temperature. There results a fast red dyeing.

What we claim is:—

1. Process for the production of dyeings on the fiber, consisting in treating on the fiber ester-like derivatives of dyestuffs of the general formula $R_1$—O—$R_2$, wherein $R_1$ is the radical of a dyestuff containing at least one hydroxyl group, and $R_2$ the radical of an organic acid containing at least one water solubilizing group, with saponifying agents.

2. Process for the production of dyeings on the fiber, consisting in treating on the fiber ester-like derivatives of dyestuffs of the general formula $R_1$—O—$R_2$, wherein $R_1$ is the radical of a dyestuff containing at least one hydroxyl group, and $R_2$ the radical of an organic acid containing at least one water solubilizing group, with alkaline saponifying agents.

3. Process for the production of dyeings on the fiber, consisting in treating on the fiber ester-like derivatives of dyestuffs of the general formula $R_1$—O—$R_2$, wherein $R_1$ is the radical of a dyestuff containing at least one hydroxyl group but containing neither carboxyl nor sulfonic groups, and $R_2$ the radical of an organic acid containing at least one water solubilizing group, with alkaline saponifying agents.

4. Process for the production of dyeings on the fiber, consisting in treating on the fiber ester-like derivatives of dyestuffs of the general formula $R_1$—O—$R_2$, wherein $R_1$ is the radical of a dyestuff containing at least one hydroxyl group but containing neither carboxyl nor sulfonic groups, and $R_2$ an acyl radical containing at least one salt-forming group from the group consisting of carboxyl groups and sulfonic groups, with alkaline saponifying agents.

5. Process for the production of dyeings on the fiber, consisting in treating on the fiber ester-like derivatives of dyestuffs of the general formula $R_1$—O—$R_2$, wherein $R_1$ is the radical of an azo-dyestuff containing at least one hydroxyl group but containing neither carboxyl nor sulfonic groups, and $R_2$ an acyl radical containing at least one salt-forming group from the group consisting of carboxyl groups and sulfonic groups, with alkaline saponifying agents.

6. Process for the production of dyeings on the fiber, consisting in treating on the fiber ester-like derivatives of dyestuffs of the general formula $R_1$—O—$R_2$, wherein $R_1$ is the radical of an azo-dyestuff containing at least one hydroxyl group but containing neither carboxyl nor sulfonic groups, and $R_2$ a benzoyl radical containing at least one and not more than two sulfonic groups, with alkaline saponifying agents.

7. Process for the production of dyeings on the fiber, consisting in treating on the fiber ester-like derivatives of dyestuffs of the general formula $R_1$—O—$R_2$, wherein $R_1$ is the radical of an azo-dyestuff containing at least one hydroxyl group but containing neither carboxyl nor sulfonic groups, and $R_2$ a benzoyl radical carrying a sulfonic group in meta-position to the benzoyl group, with alkaline saponifying agents.

8. Process for the production of dyeings on the fiber, consisting in treating on the fiber ester-like derivatives of dyestuffs of the general formula $R_1$—O—$R_2$, wherein $R_1$ is the radical of an azo-dyestuff containing at least one hydroxyl group but containing neither carboxyl nor sulfonic groups, and $R_2$ a benzoyl radical carrying one sulfo group each in 3- and 5-position to the benzoyl radical, with alkaline saponifying agents.

9. Process for the production of dyeings on the fiber, consisting in treating on the fiber ester-like derivatives of dyestuffs of the general formula $R_1$—O—$R_2$, wherein $R_1$ is the radical of an azo-dyestuff containing at least one hydroxyl group but containing neither carboxyl nor sulfonic groups, and $R_2$ a benzoyl radical containing at least one and not more than two water solubilizing groups selected from the group consisting of sulfo groups and carboxyl groups.

10. Process for the production of dyeings on the fiber, consisting in treating on the fiber ester-like derivatives of dyestuffs of the general formula $R_1$—O—$R_2$, wherein $R_1$ is the radical of an azo-dyestuff containing at least one hydroxyl group but containing neither carboxyl nor sulfonic groups, and $R_2$ an aromatic radical selected from the group consisting of aromatic radicals of the benzene and naphthalene series and containing at least one and not more than two water solubilizing groups selected from the group consisting of sulfo groups and carboxyl groups.

11. Process for the production of dyeings on the fiber, consisting in treating on the fiber ester-like derivatives of dyestuffs of the general formula $R_1$—O—$R_2$, wherein $R_1$ is the radical of a dyestuff containing at least one hydroxyl group but containing neither carboxyl nor sulfonic groups, and $R_2$ a benzoyl radical containing at least one and not more than two water solubilizing groups selected from the group consisting of sulfo groups and carboxyl groups.

12. Process for the production of dyeings on the fiber, consisting in treating on the fiber ester-like derivatives of dyestuffs of the general formula $R_1$—O—$R_2$, wherein $R_1$ is the radical of a dyestuff containing at least one hydroxyl group but containing neither carboxyl nor sulfonic groups, and $R_2$ an aromatic radical selected from the group consisting of aromatic radicals of the benzene and naphthalene series and containing at least one and not more than two water solubilizing groups selected from the group consisting of sulfo groups and carboxyl groups.

13. A composition of matter for the purpose of printing, characterized by a content of water, a thickening, and an ester-like derivative of the dyestuffs of the general formula $R_1$—O—$R_2$, wherein $R_1$ is the radical of a dyestuff containing at least one hydroxyl group but containing neither carboxyl nor sulfonic groups, and $R_2$ the radical of an organic acid containing at least one group provoking solubility in water.

14. A composition of matter for the purpose of printing, characterized by a content of water, a thickening, and an ester-like derivative of the dyestuffs of the general formula $R_1$—O—$R_2$, wherein $R_1$ is the radical of a dyestuff containing at least one hydroxyl group but containing neither carboxyl nor sulfonic groups, and $R_2$ an acyl radical containing at least one salt-forming group from the group consisting of carboxyl groups and sulfonic groups.

15. A composition of matter for the purpose of printing, characterized by a content of water, a thickening, and an ester-like derivative of the dyestuffs of the general formula $R_1$—O—$R_2$, wherein $R_1$ is the radical of an azo-dyestuff containing at least one hydroxyl group but containing neither carboxyl nor sulfonic groups, and $R_2$ an acyl radical containing at least one salt-forming 16. A composition of matter for the purpose of printing, characterized by a content of water, a thickening, and an ester-like derivative of the dyestuffs of the general formula $R_1$—O—$R_2$, wherein $R_1$ is the radical of an azo-dyestuff containing at least one hydroxyl group but containing neither carboxyl nor sulfonic groups, and $R_2$ a benzoyl radical containing at least one and not more than two water solubilizing groups selected from the group consisting of sulfo groups and carboxyl groups.

17. A composition of matter for the purpose of printing, characterized by a content of water, a thickening, and an ester-like derivative of the dyestuffs of the general formula $R_1$—O—$R_2$, wherein $R_1$ is the radical of an azo-dyestuff containing at least one hydroxyl group but containing neither carboxyl nor sulfonic groups, and $R_2$ an aromatic radical selected from the group consisting of aromatic radicals of the benzene and naphthalene series and containing at least one and not more than two water solubilizing groups selected from the group consisting of sulfo groups and carboxyl groups.

18. A composition of matter for the purpose of printing, characterized by a content of water, a thickening, and an ester-like derivative of the dyestuffs of the general formula $R_1$—O—$R_2$, wherein $R_1$ is the radical of a dyestuff containing at least one hydroxyl group but containing neither carboxyl nor sulfonic groups, and $R_2$ a benzoyl radical containing at least one and not more than two water solubilizing groups selected from the group consisting of sulfo groups and carboxyl groups.

19. A composition of matter for the purpose of printing, characterized by a content of water, a thickening, and an ester-like derivative of the dyestuffs of the general formula $R_1$—O—$R_2$, wherein $R_1$ is the radical of a dyestuff containing at least one hydroxyl group but containing neither carboxyl nor sulfonic groups, and $R_2$ an aromatic radical selected from the group consisting of aromatic radicals of the benzene and naphthalene series and containing at least one and not more than two water solubilizing groups selected from the group consisting of sulfo groups and carboxyl groups.

20. A composition of matter for the purpose of printing, characterized by a content of water, a thickening, and an ester-like derivative of the dyestuffs of the general formula $R_1$—O—$R_2$, wherein $R_1$ is the radical of an azo-dyestuff containing at least one hydroxyl group but containing neither carboxyl nor sulfonic groups, and $R_2$ a benzoyl radical containing at least one and not more than two sulfonic groups.

21. A composition of matter for the purpose of printing, characterized by a content of water, a thickening, and an ester-like derivative of the dyestuffs of the general formula $R_1$—O—$R_2$, wherein $R_1$ is the radical of an azo-dyestuff containing at least one hydroxyl group but containing neither carboxyl nor sulfonic groups, and $R_2$ a benzoyl radical carrying a sulfonic group in meta-position to the benzoyl group.

22. A composition of matter for the purpose of printing, characterized by a content of water, a thickening, and an ester-like derivative of the dyestuffs of the general formula $R_1$—O—$R_2$, wherein $R_1$ is the radical of an azo-dyestuff containing at least one hydroxyl group but containing neither carboxyl nor sulfonic groups, and $R_2$ a benzoyl radical carrying one sulfo group each in 3- and 5-position to the benzoyl radical.

CHARLES GRAENACHER.
FRANZ ACKERMANN.
HEINRICH BRUENGGER.